US012698425B2

(12) United States Patent (10) Patent No.: US 12,698,425 B2

Takamori (45) Date of Patent: Aug. 4, 2026

(54) HOT MELT ADHESIVE

(71) Applicant: HENKEL AG & CO., KGaA, Duesseldorf (DE)

(72) Inventor: Ai Takamori, Osaka (JP)

(73) Assignee: HENKEL AG & CO., KGaA, Duesseldorf (DE)

( * ) Notice: Subject to any disclaimer, the term of this patent is extended or adjusted under 35 U.S.C. 154(b) by 555 days.

(21) Appl. No.: 18/327,185

(22) Filed: Jun. 1, 2023

(65) Prior Publication Data

US 2023/0303897 A1 Sep. 28, 2023

Related U.S. Application Data

(63) Continuation of application No. PCT/JP2021/044670, filed on Dec. 6, 2021.

(30) Foreign Application Priority Data

Dec. 11, 2020 (JP) ................................. 2020-206097

(51) Int. Cl.
| | |
|---|---|
| *C09J 123/08* | (2006.01) |
| *C09J 5/06* | (2006.01) |
| *C09J 11/08* | (2006.01) |
| *C09J 133/10* | (2006.01) |

(52) U.S. Cl.
CPC ......... *C09J 123/0807* (2013.01); *C09J 11/08* (2013.01); *C09J 133/10* (2013.01)

(58) Field of Classification Search
CPC ....... C09J 5/06; C09J 7/21; C09J 11/08; C09J 2301/304
See application file for complete search history.

(56) References Cited

U.S. PATENT DOCUMENTS

2013/0345355 A1 12/2013 Takamori

FOREIGN PATENT DOCUMENTS

| | | |
|---|---|---|
| JP | 2012177009 A | 9/2012 |
| JP | 2019026656 A | 2/2019 |
| JP | 2019034999 A | 3/2019 |
| WO | WO-2006082478 A2 * | 8/2006 ............ C09J 133/10 |

OTHER PUBLICATIONS

PCT International Search Report—WO PCT/JP2021/044670—Completed: Feb. 7, 2022; Mailing date: Feb. 23, 2022—No. of pp. 3.

* cited by examiner

*Primary Examiner* — Christopher M Rodd

(74) *Attorney, Agent, or Firm* — Sun Hee Thomas

(57) ABSTRACT

Disclosed is a hot melt adhesive comprising: (A) a copolymer of ethylene with an olefin having 3 to 20 carbon atoms; (B) a copolymer of ethylene with a carboxylic acid derivative having an ethylenic double bond; and (C) a tackifying resin, wherein the (B) copolymer of ethylene with a carboxylic acid derivative having an ethylenic double bond comprises (B1) a copolymer of ethylene with a (meth)acrylic acid derivative, which copolymer (B1) has a melt flow rate of 1 to 38 g/10 min.

14 Claims, No Drawings

HOT MELT ADHESIVE

TECHNICAL FIELD

The present invention relates to a hot melt adhesive, more specifically a hot melt adhesive that has good adhesion to various substrates and is particularly suitable for assembling paper substrates such as corrugated cardboards.

BACKGROUND ART

Hot melt adhesives are solvent-free adhesives that exhibits adhesiveness when heat-melted to be applied to an adherend and subsequently cooled to solidify; therefore, hot melt adhesives are characterized by enabling instantaneous adhesion and rapid adhesion and are thus used in a wide range of fields including paper processing, woodworking, sanitary materials, and electronics.

As base polymers of such hot melt adhesives, in accordance with the intended use, for example, ethylene-based copolymers such as ethylene-vinyl acetate copolymers (hereinafter, also referred to as "EVA") and ethylene-ethyl acrylate copolymers (hereinafter, also referred to as "EEA"); olefin-based resins such as polyethylenes, polypropylenes, and amorphous poly-α-olefins (hereinafter, also referred to as "APAO"); synthetic rubbers such as styrene-based block copolymers (e.g., styrene-isoprene-styrene-based block copolymers (hereinafter, also referred to as "SIS")), styrene-butadiene-styrene-based block copolymers (hereinafter, also referred to as "SBS"), and hydrogenated products thereof; and polyurethanes are generally used.

Among these hot melt adhesives, those containing an ethylene-based copolymer as a base polymer are often utilized in the field of paper processing such as bookbinding and packaging, as well as in the field of woodworking.

For application of a hot melt adhesive, a dedicated application device called "hot melt applicator" is used in many cases. The hot melt applicator has a nozzle that is a discharge port, and a hot melt adhesive is heated to about 120 to 190° C. and discharged from a tip of the nozzle to be applied to an adherend. During the application of the hot melt adhesive, a string-like matter of the hot melt adhesive may be generated between the tip of the nozzle and the adherend. Such a string-like matter is generated due to the stringiness of the hot melt adhesive and contaminates the nozzle and the adherend. Therefore, it is an important duty for adhesive manufacturers to develop a hot melt adhesive with less stringing.

PTLs 1 to 3 disclose hot melt adhesives that contain an ethylene-based copolymer for reduction of stringing.

The hot melt adhesive of PTL 1 contains an ethylene-α-olefin copolymer and an ethylene-carboxylic acid ester copolymer (see [Claim 1] and [0046] to [0056]). The problem of the generation of a string-like matter is reduced by the hot melt adhesive of PTL 1. However, the hot melt adhesive of PTL 1 does not have a sufficient thermal stability, and it is thus demanded to further improve the thermal stability.

PTL 2 discloses a hot melt adhesive that contains an ethylene-α-olefin copolymer, a functionalized ethylene-α-olefin copolymer, and an ethylene-(meth)acrylic acid ester copolymer (see [Claim 1] and [0053] to [0067]). The hot melt adhesive of PTL 2 can reduce stringing to a certain extent; however, it cannot be said to have a sufficient thermal stability.

Similarly to PTL 2, the hot melt adhesive of PTL 3 also contains a functionalized ethylene-α-olefin copolymer and an ethylene-(meth)acrylic acid ester copolymer (see [0063] to [0066]), and cannot be said to have excellent thermal stability.

In recent years, there is an increasing user demand for reduction of stringing in hot melt adhesives, and the hot melt adhesives of PTLs 1 to 3 cannot be said to fully satisfy the high performance demanded by the users in terms of thermal stability and reduction of stringing.

A hot melt adhesive should naturally have excellent adhesion to an adherend such as paper and, in recent years, it is required that a hot melt adhesive be cured in a short time after being applied to an adherend, i.e. have a short set time. When a hot melt adhesive having a long set time is applied to an adherend, solidification of the adhesive takes a long time, resulting in a reduction in the product productivity.

CITATION LIST

Patent Literature

[PTL 1] JP 2012-177009 A
[PTL 2] JP 2019-26656 A
[PTL 3] JP 2019-34999 A

SUMMARY OF INVENTION

Technical Problem

An object of the present invention is to provide a hot melt adhesive that not only can reduce stringing and has excellent thermal stability but also exhibits excellent adhesion to paper with a short set time.

Solution to Problem

The present inventors intensively studied to discover that: a hot melt adhesive that can solve the above-described problems is obtained when the hot melt adhesive contains (A) a copolymer of ethylene with an olefin having 3 to 20 carbon atoms, (B) a copolymer of ethylene with a carboxylic acid derivative having an ethylenic double bond, and (C) a tackifying resin, and the (B) copolymer of ethylene with a carboxylic acid derivative having an ethylenic double bond contains a copolymer of ethylene with a carboxylic acid derivative having an ethylenic double bond, which copolymer has a specific property; and such a hot melt adhesive is preferred in the fields of paper processing, woodworking and the like, thereby completing the present invention.

The present specification encompasses the following embodiments.

1. A hot melt adhesive comprising:
   (A) a copolymer of ethylene with an olefin having 3 to 20 carbon atoms;
   (B) a copolymer of ethylene with a carboxylic acid derivative having an ethylenic double bond; and
   (C) a tackifying resin,
   wherein the (B) copolymer of ethylene with a carboxylic acid derivative having an ethylenic double bond comprises (B1) a copolymer of ethylene with a (meth) acrylic acid derivative, which copolymer (B1) has a melt flow rate of 1 to 38 g/10 min.
2. The hot melt adhesive according to 1, wherein the content of the component (B1) is 1 to 10 parts by mass with respect to a total of 100 parts by mass of the components (A) to (C).
3. The hot melt adhesive according to 1 or 2, wherein the component (B1) comprises a copolymer of ethylene with a (meth)acrylic acid ester (an ethylene-(meth) acrylic acid ester copolymer).

4. The hot melt adhesive according to 3, wherein the component (B1) comprises an ethylene-(meth)acrylic acid ester copolymer containing a structural unit derived from the (meth)acrylic acid ester in an amount of 2 to 24% by mass.

5. The hot melt adhesive according to 3 or 4, wherein the component (B1) comprises at least one ethylene-(meth) acrylic acid ester copolymer selected from ethylene-methyl methacrylate copolymers, ethylene-butyl acrylate copolymers, and ethylene-ethyl acrylate copolymers.

6. The hot melt adhesive according to any one of 1 to 5, wherein the hot melt adhesive further comprises (D) a wax, and the wax (D) comprises a Fischer-Tropsch wax.

7. The hot melt adhesive according to 6, wherein the content of the Fischer-Tropsch wax is not less than 80% by mass with respect to a total of 100 parts by mass of the (D) wax.

8. The hot melt adhesive according to any one of 1 to 7, wherein the (C) tackifying resin comprises (C1) a partially hydrogenated tackifying resin and (C2) a completely hydrogenated tackifying resin.

9. The hot melt adhesive according to any one of 1 to 8, wherein the (C) tackifying resin comprises a hydrocarbon resin having a softening point of lower than 120° C., and a hydrocarbon resin having a softening point of 120° C. or higher.

10. A paper product comprising the hot melt adhesive according to any one of 1 to 9.

Advantageous Effects of Invention

The hot melt adhesive according to one embodiment of the present invention can reduce stringing and has excellent thermal stability and excellent adhesion to paper as well as a short set time and, therefore, can contribute to an improvement in the product productivity.

When the hot melt adhesive according to one embodiment of the present invention is applied from a nozzle to an adherend such as paper, the nozzle and the adherend are not contaminated with a string-like matter of the hot melt adhesive. Even after being stored in a storage tank over a prolonged period, the hot melt adhesive generates neither a carbide nor a precipitate, and an increase in the viscosity of the hot melt adhesive is inhibited; therefore, the hot melt adhesive does not cause an adverse effect in the application operation.

DESCRIPTION OF EMBODIMENTS

The hot melt adhesive according to one embodiment of the present invention contains, as indispensable components: (A) a copolymer of ethylene with an olefin having 3 to 20 carbon atoms; (B) a copolymer of ethylene with a carboxylic acid derivative having an ethylenic double bond; and (C) a tackifying resin.

The term "hot melt adhesive" used herein refers to an adhesive that is solid at normal temperature but has a fluidity when melted by heating, and can be applied to an object such as a substrate or an adherend and cured by cooling to perform adhesion.

<(A) Copolymer of Ethylene With Olefin Having 3 to 20 Carbon Atoms>

In one embodiment of the present invention, the "(A) copolymer of ethylene with an olefin having 3 to 20 carbon atoms" refers to a copolymer of ethylene and an olefin having 3 to 20 carbon atoms, and it is not particularly limited as long as the intended hot melt adhesive of the present invention can be obtained.

Specific examples of the "olefin having 3 to 20 carbon atoms" include propylene, 1-butene, 1-pentene, 1-hexene, 1-heptene, 1-octene, 1-nonene, 1-decene, cis-2-butene, trans-2-butene, isobutylene, cis-2-pentene, trans-2-pentene, 3-methyl-1-butene, 2-methyl-2-butene, and 2,3-dimethyl-2-butene. The olefin having 3 to 20 carbon atoms is preferably an olefin having 3 to 10 carbon atoms, more preferably propylene, butene, hexene, or octene, still more preferably propylene, butene, or octene, particularly preferably octene.

The (A) copolymer of ethylene with an olefin having 3 to 20 carbon atoms is preferably a copolymer polymerized using a metallocene catalyst. The hot melt adhesive according to one embodiment of the present invention is made harder and unlikely to cause stringing by containing the copolymer (A) (metallocene-based copolymer of ethylene with an olefin having 3 to 20 carbon atoms) polymerized using a metallocene catalyst.

Examples of the (A) copolymer of ethylene with an olefin having 3 to 20 carbon atoms include copolymers of ethylene and octene (ethylene-octene copolymers), copolymers of ethylene, propylene and 1-butene (ethylene-propylene-butene copolymers), copolymers of ethylene and propylene (ethylene-propylene copolymers), copolymers of ethylene and butene (ethylene-butene copolymers), and copolymers of ethylene and hexene (ethylene-hexene copolymers).

Particularly, the (A) copolymer of ethylene with an olefin having 3 to 20 carbon atoms preferably contains a copolymer of ethylene and octene, a copolymer of ethylene and propylene, a copolymer of ethylene and butene, or a copolymer of ethylene and hexene, more preferably contains a copolymer of ethylene and octene. As the (A) copolymer of ethylene with an olefin having 3 to 20 carbon atoms, a commercially available product can be used.

Examples of the ethylene-octene copolymers include AFFINITY GA1900 (trade name), AFFINITY GA1950 (trade name), AFFINITY GA1875 (trade name), AFFINITY GA1000R (trade name), AFFINITY EG8185 (trade name), AFFINITY EG8200 (trade name), ENGAGE 8137 (trade name), ENGAGE 8180 (trade name), and ENGAGE 8400 (trade name), all of which are manufactured by Dow Chemical Company.

Examples of the ethylene-propylene-1-butene copolymers include VESTOPLAST 730 (trade name) and VESTOPLAST 708 (trade name), which are manufactured by Evonik Degussa GmbH.

Examples of the ethylene-propylene copolymers include EASTOFLEX E1016PL-1 manufactured by Eastman Chemical Co., and VISTAMAXX (trade name) Series manufactured by Exxon Mobil Corporation.

Examples of the ethylene-butene copolymers include TAFMER A4085 manufactured by Mitsui Chemicals, Inc.

Examples of the ethylene-hexene copolymers include NIPOLON Z HM510R manufactured by Tosoh Corporation.

These copolymers of ethylene with an olefin having 3 to 20 carbon atoms may be used singly or in combination.

In the present invention, taking a reduction of stringing into consideration, the (A) copolymer of ethylene with an olefin having 3 to 20 carbon atoms is preferably an ethylene-octene copolymer.

<(B) Copolymer of Ethylene With Carboxylic Acid Derivative Having Ethylenic Double Bond>

In one embodiment of the present invention, the "(B) copolymer of ethylene with a carboxylic acid derivative having an ethylenic double bond" (hereinafter, also referred to as "copolymer (B)" or "component (B)") refers to a copolymer of ethylene and a carboxylic acid derivative having an ethylenic double bond, and it is not particularly limited as long as the intended hot melt adhesive of the present invention can be obtained.

The term "carboxylic acid derivative having an ethylenic double bond" used herein refers to a carboxylic acid derivative (including carboxylic acid) having a carbon-carbon double bond that can be addition-polymerized with ethylene and, in the present specification, specific examples of such a carboxylic acid derivative include a "carboxylic acid having an ethylenic double bond", a "carboxylic anhydride having an ethylenic double bond", and a "carboxylic acid ester having an ethylenic double bond".

The "carboxylic acid having an ethylenic double bond" refers to a compound having an ethylenic double bond and a carboxyl group, and it is not particularly limited as long as the intended hot melt adhesive of the present invention can be obtained. Specific examples of the "carboxylic acid having an ethylenic double bond" include oleic acid, linoleic acid, maleic acid, itaconic acid, acrylic acid, and methacrylic acid.

The "carboxylic anhydride having an ethylenic double bond" refers to a compound in which two carboxylic acid molecules are dehydrated and condensed, or a compound in which two carboxyl groups are dehydrated in one molecule, and it is not particularly limited as long as the intended hot melt adhesive of the present invention can be obtained. Specific examples of the "carboxylic anhydride having an ethylenic double bond" include fumaric anhydride and maleic anhydride.

Examples of the "carboxylic acid ester having an ethylenic double bond" include: (meth)acrylic acid esters such as methyl (meth)acrylate, ethyl (meth)acrylate, butyl (meth) acrylate, and 2-ethylhexyl (meth)acrylate; vinyl carboxylates and allyl esters such as vinyl acetate and allyl acetate.

The term "(meth)acrylic acid ester" used herein encompasses both acrylic acid ester and methacrylic acid ester.

In one embodiment of the present invention, the "carboxylic acid ester having an ethylenic double bond" preferably contains a (meth)acrylic acid ester, such as methyl (meth)acrylate, ethyl (meth)acrylate, butyl (meth)acrylate, or 2-ethylhexyl (meth)acrylate, more preferably contains methyl (meth)acrylate, ethyl (meth)acrylate, or butyl (meth) acrylate, particularly desirably contains methyl methacrylate or ethyl acrylate.

The "(B) copolymer of ethylene with a carboxylic acid derivative having an ethylenic double bond" is, for example, a copolymer of ethylene with a carboxylic acid having an ethylenic double bond (a copolymer of ethylene-carboxylic acid having an ethylenic double bond), a copolymer of ethylene with a carboxylic anhydride having an ethylenic double bond (a copolymer of ethylene-carboxylic anhydride having an ethylenic double bond), or a copolymer of ethylene with a carboxylic acid ester having an ethylenic double bond (a copolymer of ethylene-carboxylic acid ester having an ethylenic double bond).

Examples of the copolymer of ethylene with a carboxylic acid having an ethylenic double bond include copolymers of ethylene and (meth)acrylic acid (ethylene-(meth)acrylic acid copolymers), and examples of the copolymer of ethylene with a carboxylic acid ester having an ethylenic double bond include: copolymers of ethylene and a (meth)acrylic acid ester (ethylene-(meth)acrylic acid ester copolymers); copolymers of ethylene and vinyl carboxylate (ethylene-vinyl carboxylate copolymers); and copolymers of ethylene and allyl carboxylate (ethylene-allyl carboxylate copolymers).

In one embodiment of the present invention, the (B) copolymer of ethylene with a carboxylic acid derivative having an ethylenic double bond preferably contains a "copolymer of ethylene and a (meth)acrylic acid derivative". The "copolymer of ethylene and a (meth)acrylic acid derivative" preferably contains at least one selected from an ethylene-(meth)acrylic acid ester copolymer, an ethylene-(meth)acrylic acid copolymer, and an ethylene-(meth) acrylic anhydride copolymer, and most desirably contains an ethylene-(meth)acrylic acid ester copolymer.

In the hot melt adhesive according to one embodiment of the present invention, stringing can be reduced and the thermal stability is improved by incorporating a "copolymer of ethylene and a (meth)acrylic acid derivative" into the component (B).

The copolymer of ethylene and a (meth)acrylic acid derivative preferably contains a copolymer of ethylene and a (meth)acrylic acid ester (ethylene-(meth)acrylic acid ester copolymer), more preferably contains at least one selected from an ethylene-methyl (meth)acrylate copolymer, an ethylene-ethyl (meth)acrylate copolymer, an ethylene-butyl (meth)acrylate copolymer, and an ethylene-2-ethylhexyl (meth)acrylate copolymer, still more preferably contains at least one selected from an ethylene-methyl (meth)acrylate copolymer, an ethylene-ethyl (meth)acrylate copolymer, and an ethylene-butyl (meth)acrylate copolymer, particularly desirably contains an ethylene-methyl methacrylate copolymer and/or an ethylene-ethyl acrylate copolymer.

In one embodiment of the present invention, the component (B) contains (B1) a copolymer of ethylene with a (meth)acrylic acid derivative, and the melt flow rate of this component (B1) may be 1 to 38 g/10 min or 1 to 35 g/10 min, and it is preferably 1 to 30 g/10 min, most desirably 2 to 25 g/10 min.

In the hot melt adhesive according to one embodiment of the present invention, when the melt flow rate of the component (B1) is in this range, stringing is further reduced and the thermal stability is improved. It is noted here that, in the present specification, the melt flow rate is a value measured at 190° C. with a 2.16-kg load in accordance with JIS K7210.

Examples of the (B1) copolymer of ethylene with a (meth)acrylic acid derivative include ethylene-(meth)acrylic acid ester copolymers, ethylene-(meth)acrylic acid ester copolymers, and ethylene-(meth)acrylic anhydride copolymers.

The (B1) copolymer of ethylene with a (meth)acrylic acid derivative is not particularly limited as long as the intended hot melt adhesive of the present invention can be obtained; however, the (B1) copolymer of ethylene with a (meth) acrylic acid derivative particularly preferably contains an ethylene-(meth)acrylic acid ester copolymer.

The ethylene-(meth)acrylic acid ester copolymer contained in the component (B1) preferably contains at least one selected from an ethylene-methyl methacrylate copolymer, an ethylene-butyl acrylate copolymer, an ethylene-ethyl acrylate copolymer, and an ethylene-2-ethylhexyl (meth) acrylate copolymer, more preferably contains at least one selected from an ethylene-methyl methacrylate copolymer, an ethylene-butyl acrylate copolymer, and an ethylene-ethyl acrylate copolymer, particularly preferably contains an ethylene-methyl methacrylate copolymer and/or an ethylene-butyl acrylate copolymer, and most desirably contains an ethylene-methyl methacrylate copolymer.

In the hot melt adhesive according to one embodiment of the present invention, when the component (B1) contains an ethylene-(meth)acrylic acid ester copolymer, not only stringing can be further reduced and excellent thermal stability can be maintained, but also excellent adhesion to paper and a short set time can be obtained.

In the ethylene-(meth)acrylic acid ester copolymer contained in the component (B1), the content of a structural unit derived from the (meth)acrylic acid ester is preferably 2 to 24% by mass, particularly preferably 4 to 24% by mass, more desirably 6 to 24% by mass, most desirably 7 to 24% by mass.

When the content of a structural unit derived from the (meth)acrylic acid ester in the ethylene-(meth)acrylic acid ester copolymer contained in the component (B1) is in this range, the thermal stability of the hot melt adhesive according to one embodiment of the present invention can be markedly improved.

In the present specification, the content of a structural unit derived from the (meth)acrylic acid ester in the ethylene-(meth)acrylic acid ester copolymer contained in the component (B1) means an amount (% by mass) of the structural unit derived from the (meth)acrylic acid ester with respect to a total amount of the (B1) ethylene-(meth)acrylic acid ester copolymer.

The ethylene-(meth)acrylic acid ester copolymer contained in (B1) has a chemical structure derived from ethylene and a chemical structure derived from the (meth)acrylic acid ester.

The "structural unit derived from the (meth)acrylic acid ester" refers to, among the chemical structures of the ethylene-(meth)acrylic acid ester copolymer, a chemical structure derived from the (meth)acrylic acid ester.

For example, an "ethylene-methyl methacrylate copolymer having a methyl methacrylate content of 20% by mass" means that a chemical structure derived from methyl methacrylate is contained in a total of 20% by mass with respect to a total mass of 100% by mass of (B1).

In the present specification, the content of a structural unit derived from an ethylene-(meth)acrylic acid ester copolymer can be determined by infrared absorption spectrometry using a press sheet of the component (B1).

For example, when the (meth)acrylic acid ester is methyl methacrylate, the content of a structural unit derived from methyl methacrylate in an ethylene-methyl methacrylate copolymer can be measured in accordance with JIS K7192.

A peak attributed to the (meth)acrylic acid ester copolymer is used as characteristic absorption of an infrared absorption spectrum, and the absorbance is corrected with the thickness of the press sheet to determine the comonomer content. For example, when the (meth)acrylic acid ester is methyl methacrylate, the content of methyl methacrylate unit in an ethylene-methyl methacrylate copolymer can be determined by preparing a 0.3 mm-thick press sheet and measuring the press sheet by infrared absorption spectrometry using an infrared spectrometer. A peak at 3,448 $cm^{-1}$, which is attributed to methyl methacrylate, is used as characteristic absorption of the resulting infrared absorption spectrum, and the absorbance is corrected with the thickness to determine the content in accordance with the following equation:

$$MMA = 4.1 \times \log(I0/I)/t - 5.3$$

[wherein, MMA represents the content (% by mass) of methyl methacrylate unit; I represents the transmitted light intensity at a frequency of 3,448 $cm^{-1}$; I0 represents the incident light intensity at a frequency of 3,448 $cm^{-1}$; and t represents the thickness (cm) of a measurement sample sheet].

A method of producing the (B1) copolymer of ethylene with a (meth)acrylic acid derivative is not particularly limited and, for example, a known liquid-phase polymerization method or a high-pressure radical polymerization method can be employed. Examples of a method of producing the component (B1) by high-pressure radical polymerization include a method of polymerizing ethylene with a (meth)acrylic acid derivative (e.g., (meth)acrylic acid ester) in the presence of a radical generator at a polymerization pressure of 140 MPa to 300 MPa and a polymerization temperature of 100° C. to 300° C., generally using a tank-type reactor or a tube-type reactor.

Further, in order to adjust the melt flow rate, hydrogen or a hydrocarbon such as methane or ethane can be used as a molecular weight modifier.

As the (B1) copolymer of ethylene with a (meth)acrylic acid derivative, a commercially available product can be used. Examples of the commercially available product include:

ACRYFT WH401-F (trade name), ACRYFT WH206-F (trade name), ACRYFT WD301-F (trade name), and ACRYFT WD203-1 (trade name), which are manufactured by Sumitomo Chemical Co., Ltd.;

LOTRYL 17BA07N (trade name), LOTRYL 24MA02N (trade name), and LOTADER 4503 (trade name), which are manufactured by Arkema K.K.;

NUC-6220 (trade name) and DPDJ-9169 (trade name) which are manufactured by Dow Chemical Company;

NUCREL N1035 (trade name) manufactured by Dow-Mitsui Polychemicals Co., Ltd.; and ESCOR 5080 (trade name) manufactured by Exxon Mobil Corporation.

The (B) copolymer of ethylene with a carboxylic acid derivative having an ethylenic double bond may also contain other copolymer of ethylene with a carboxylic acid derivative having an ethylenic double bond (component (B2)), which copolymer does not correspond to the component (B1) (copolymer of ethylene with a (meth)acrylic acid derivative) that has a melt flow rate of 1 to 38 g/10 min.

The component (B2) is a copolymer of ethylene with a carboxylic acid derivative having an ethylenic double bond, which copolymer does not correspond to the component (B1), and specific examples of the component (B2) include:

copolymers of ethylene with a (meth)acrylic acid derivative, which have a melt flow rate of higher than 38 g/10 min;

copolymers of ethylene with a (meth)acrylic acid derivative, which have a melt flow rate of lower than 1 g/10 min; and copolymers of ethylene with a carboxylic acid derivative (excluding (meth)acrylic acid derivative) having an ethylenic double bond, such as copolymers of ethylene and an itaconic acid derivative (ethylene-itaconic acid derivative copolymers), copolymers of ethylene and vinyl acetate (ethylene-vinyl acetate copolymers), and copolymers of ethylene and allyl carboxylate (ethylene-allyl carboxylate copolymers).

<(C) Tackifying Resin>

The (C) tackifying resin is not particularly limited as long as it is usually used in hot melt adhesives and the intended hot melt adhesive of the present invention can be obtained. Taking the intended hot melt adhesive of the present invention into consideration, the (C) tackifying resin preferably contains both (C1) a partially hydrogenated tackifying resin and (C2) a completely hydrogenated tackifying resin.

In the present specification, the (C1) partially hydrogenated tackifying resin is a tackifier in which hydrogen is added to some of the double bonds contained in the tackifier, and the (C2) completely hydrogenated tackifying resin is a tackifier in which hydrogen is added to all of the double bonds contained in the tackifier.

The (C1) partially hydrogenated tackifying resin has a good compatibility with the (B) copolymer of ethylene with a carboxylic acid derivative having an ethylenic double bond, while the (C2) completely hydrogenated tackifying resin has a good compatibility with the (A) copolymer of ethylene with an olefin having 3 to 20 carbon atoms. In other words, when the (C) tackifying resin contains both of the components (C1) and (C2), the compatibility of the hot melt adhesive is improved, as a result of which the thermal stability is markedly improved.

Examples of the (C) tackifying resin include natural rosins, modified rosins, hydrogenated rosins, glycerol esters of natural rosins, glycerol esters of modified rosins, pentaerythritol esters of natural rosins, pentaerythritol esters of modified rosins, pentaerythritol esters of hydrogenated rosins, copolymers of natural terpenes, three-dimensional polymers of natural terpenes, hydrogenated derivatives of copolymers of hydrogenated terpenes, polyterpene resins, hydrogenated derivatives of phenolic modified terpene resins, aliphatic petroleum hydrocarbon resins, hydrogenated derivatives of aliphatic petroleum hydrocarbon resins, aromatic petroleum hydrocarbon resins, hydrogenated derivatives of aromatic petroleum hydrocarbon resins, cyclic aliphatic petroleum hydrocarbon resins, and hydrogenated derivatives of cyclic aliphatic petroleum hydrocarbon resins. These tackifying resins may be used singly or in combination. As the tackifying resin, a liquid-type tackifying resin can also be used as long as it is colorless to pale yellow in color tone and has good thermal stability with substantially no odor.

The (C) tackifying resin preferably contains both a hydrocarbon resin having a softening point of lower than 120° C. and a hydrocarbon resin having a softening point of 120° C. or higher. In the hot melt adhesive according to one embodiment of the present invention, by incorporating both a hydrocarbon resin having a softening point of lower than 120° C. and a hydrocarbon resin having a softening point of 120° C. or higher, stringing can be further reduced while further improving the adhesion, and the thermal stability is further improved as well. It is noted here that the softening point of the (C) tackifying resin is measured in accordance with JIS K2207.

As the (C) tackifying resin, a commercially available product can be used. Examples of the commercially available product include: T-REZ HC103 (trade name), T-REZ HA103 (trade name), and T-REZ HA125 (trade name), which are manufactured by ENEOS Corporation; ECR5600 (trade name) manufactured by Exxon Mobil Corporation; MARUKACLEAR H (trade name) manufactured by Maruzen Petrochemical Co., Ltd.; CLEARON K100 (trade name) manufactured by Yasuhara Chemical Co., Ltd.; ARKON M100 (trade name) manufactured by Arakawa Chemical Industries, Ltd.; I-MARV S100 (trade name), I-MARV Y135 (trade name), and I-MARV P125 (trade name), which are manufactured by Idemitsu Kosan Co., Ltd.; CLEARON K4090 (trade name) and CLEARON K4100, which are manufactured by Yasuhara Chemical Co., Ltd.; ECR231C (trade name) and ECR179EX (trade name), which are manufactured by Exxon Mobil Corporation; and REGALITE R7100 (trade name) manufactured by Eastman Chemical Co. These commercially available tackifying resins may be used singly or in combination.

As the (C1) partially hydrogenated tackifying resin, a commercially available product can be used. As the commercially available product, for example, T-REZ HC103 (trade name) manufactured by ENEOS Corporation or ARKON M100 (trade name) manufactured by Arakawa Chemical Industries, Ltd. is preferred and, as the (C2) completely hydrogenated tackifying resin, for example, T-REZ HA103 (trade name), T-REZ HA125 (trade name), or I-MARV P125 (trade name) manufactured by Idemitsu Kosan Co., Ltd. is preferred.

In the hot melt adhesive according to one embodiment of the present invention, the (B1) copolymer of ethylene with a (meth)acrylic acid derivative is contained in an amount of preferably 1 to 10 parts by mass, particularly preferably 2 to 8 parts by mass, most desirably 2 to 7 parts by mass, per a total of 100 parts by mass of the (A) copolymer of ethylene with an olefin having 3 to 20 carbon atoms, the (B) copolymer of ethylene with a carboxylic acid derivative having an ethylenic double bond, and the (C) tackifying resin.

In the hot melt adhesive according to one embodiment of the present invention, when the content of the (B1) copolymer of ethylene with a (meth)acrylic acid derivative is in the above-described range, not only stringing is further reduced, but also the thermal stability and the adhesion to paper are improved at high levels and the set time is further shortened.

In the hot melt adhesive according to one embodiment of the present invention, the (A) copolymer of ethylene with an olefin having 3 to 20 carbon atoms is contained in an amount of preferably 25 to 60 parts by mass, particularly preferably 30 to 55 parts by mass, most desirably 30 to 50 parts by mass, per a total of 100 parts by mass of the (A) copolymer of ethylene with an olefin having 3 to 20 carbon atoms, the (B) copolymer of ethylene with a carboxylic acid derivative having an ethylenic double bond, and the (C) tackifying resin.

In the hot melt adhesive according to one embodiment of the present invention, when the content of the (A) copolymer of ethylene with an olefin having 3 to 20 carbon atoms is in the above-described range, not only stringing is further reduced, but also the thermal stability and the adhesion to paper are improved at high levels and the set time is further shortened.

<(D) Wax>

The hot melt adhesive according to one embodiment of the present invention preferably further contains (D) a wax. The term "wax" used herein means an organic matter which has a weight-average molecular weight of less than 10,000 and is solid at normal temperature but becomes liquid when heated, and the (D) wax is not particularly limited as long as it is a material which is generally referred to as "wax" and has wax-like properties, and with which the intended hot melt adhesive of the present invention can be obtained.

Examples of the wax include Fischer-Tropsch waxes, paraffin waxes, microcrystalline waxes, polyethylene waxes, and polypropylene waxes. As the wax, a commercially available product can be used, and these waxes may be used singly or in combination.

In one embodiment of the present invention, the (D) wax preferably contains a Fischer-Tropsch wax. This "Fischer-Tropsch wax" is a wax that is synthesized by a Fischer-Tropsch method and generally referred to as "Fischer-Tropsch wax". The Fischer-Tropsch wax is a wax fractionated from a wax whose component molecules have a relatively broad carbon number distribution such that the component molecules of the fractionated wax have a relatively narrow carbon number distribution. Representative Examples of the Fischer-Tropsch wax include SASOL H1 (trade name), SASOL C105 (trade name), and SASOL C80 (trade name), all of which are manufactured by Sasol Wax GmbH Co. In the hot melt adhesive according to one embodiment of the present invention, a higher thermal stability and a higher adhesive strength in a high-temperature range are attained by incorporating a Fischer-Tropsch wax.

The melting point of the wax may be, for example, 60 to 160° C. or 65 to 150° C.

The melting point of the Fischer-Tropsch wax is preferably 70 to 120° C.

The melting point of the wax is a value measured by differential scanning calorimetry (DSC). Specifically, 10 mg of a sample is weighed in an aluminum container and measured at a heating rate of 10° C./min using DSC6220 (trade name) manufactured by SII NanoTechnology Inc., and the thus determined temperature of a melting peak top is defined as the melting point.

The content of the Fischer-Tropsch wax is preferably not less than 80% by mass with respect to a total of 100 parts by mass of the (D) wax. By controlling the content of the Fischer-Tropsch wax to be in this range, the thermal stability of the hot melt adhesive of the present invention is further improved.

In one embodiment of the present invention, the (B1) copolymer of ethylene with a (meth)acrylic acid derivative is contained in an amount of preferably 1 to 10 parts by mass, particularly preferably 2 to 10 parts by mass, most desirably 2 to 6 parts by mass, per a total of 100 parts by mass of the (A) copolymer of ethylene with an olefin having 3 to 20 carbon atoms, the (B) copolymer of ethylene with a carboxylic acid derivative having an ethylenic double bond, the (C) tackifying resin, and the (D) wax.

In the hot melt adhesive according to one embodiment of the present invention, when the content of the (B1) copolymer of ethylene with a (meth)acrylic acid derivative is in the above-described range, stringing is further reduced, and the thermal stability, the adhesion to paper, and the setting property are improved at high levels.

In one embodiment of the present invention, the (A) copolymer of ethylene with an olefin having 3 to 20 carbon atoms is contained in an amount of preferably 20 to 50 parts by mass, particularly preferably 25 to 45 parts by mass, most desirably 25 to 40 parts by mass, per a total of 100 parts by mass of the (A) copolymer of ethylene with an olefin having 3 to 20 carbon atoms, the (B) copolymer of ethylene with a carboxylic acid derivative having an ethylenic double bond, the (C) tackifying resin, and the (D) wax.

In the hot melt adhesive according to one embodiment of the present invention, when the content of the (A) copolymer of ethylene with an olefin having 3 to 20 carbon atoms is in the above-described range, stringing is further reduced, and the thermal stability, the adhesion to paper, and the setting property are improved at high levels.

In one embodiment of the present invention, the (C) tackifying resin is contained in an amount of preferably 30 to 60 parts by mass, particularly preferably 35 to 55 parts by mass, most desirably 40 to 55 parts by mass, per a total of 100 parts by mass of the (A) copolymer of ethylene with an olefin having 3 to 20 carbon atoms, the (B) copolymer of ethylene with a carboxylic acid derivative having an ethylenic double bond, the (C) tackifying resin, and the (D) wax.

In the hot melt adhesive according to one embodiment of the present invention, when the content of the (C) tackifying resin is in the above-described range, stringing is further reduced, and the thermal stability, the adhesion to paper, and the setting property are improved at high levels.

The hot melt adhesive according to one embodiment of the present invention may further contain various additives as required. Examples of the additives include plasticizers, stabilizers (ultraviolet absorbers and antioxidants), and fine particulate fillers.

A "plasticizer" is incorporated for the purposes of reducing the melt viscosity of the hot melt adhesive, imparting the hot melt adhesive with flexibility and improving the wettability of the hot melt adhesive to an adherend, and the "plasticizer" is not particularly limited as long as it is compatible with the components (A) and (B) and the intended hot melt adhesive of the present invention can be obtained. Examples of the plasticizer include paraffinic oils, naphthenic oils, and aromatic oils. Colorless and odorless paraffinic oils are particularly preferred.

As the plasticizer, a commercially available product can be used. Examples thereof include: WHITE OIL BROOM 350 (trade name) manufactured by Kukdong Oil & Chemicals Co., Ltd.; DIANA FRESIA S32 (trade name), DIANA PROCESS OIL PW-90 (trade name), and DN OIL KP-68 (trade name), which are manufactured by Idemitsu Kosan Co., Ltd.; ENERPER M1930 (trade name) manufactured by BP Chemicals, Inc.; KAYDOL (trade name) manufactured by Crompton Corporation; and PRIMOL 352 (trade name) manufactured by ESSO Corp. These plasticizers may be used singly or in combination.

A "stabilizer" is incorporated for the purpose of improving the stability of the hot melt adhesive by inhibiting a molecular weight reduction, gelation, coloration, odor generation and the like of the hot melt adhesive that are caused by heat, air, light and the like, and the stabilizer is not particularly limited as long as the intended hot melt adhesive of the present invention can be obtained. Examples of the stabilizer include antioxidants and ultraviolet absorbers.

An "ultraviolet absorber" is used for improving the light resistance of the hot melt adhesive. An "antioxidant" is used for inhibiting oxidative degradation of the hot melt adhesive. The antioxidant and the ultraviolet absorber are not particularly limited as long as they are commonly used in hot melt adhesives and the below-described intended paper product can be obtained.

Examples of the "antioxidant" include phenolic antioxidants, sulfur-based antioxidants, and phosphorus-based antioxidants. Examples of the ultraviolet absorber include benzotriazole-based ultraviolet absorbers and benzophenone-based ultraviolet absorbers. Further, a lactone-based stabilizer can be added as well. These may be used singly or in combination.

As the stabilizer, a commercially available product can be used. Examples thereof include: SUMILIZER GM (trade name), SUMILIZER TPD (trade name), and SUMILIZER TPS (trade name), which are manufactured by Sumitomo Chemical Co. Ltd.; IRGANOX 1010 (trade name), IRGANOX HP2225FF (trade name), IRGAFOS 168 (trade name), and IRGANOX 1520 (trade name), which are manufactured by Ciba Specialty Chemicals Inc.; ADK STAB AO-60 (trade name) manufactured by ADEKA Corporation; and JF77 (trade name) and JP-650 (trade name) which are manufactured by Johoku Chemical Co., Ltd. These stabilizers may be used singly or in combination.

The hot melt adhesive according to one embodiment of the present invention may further contain a fine particulate filler. The fine particulate filler is not particularly limited as long as it is commonly used and the intended hot melt adhesive of the present invention can be obtained. Examples of the "fine particulate filler" include mica, calcium carbonate, kaolin, talc, titanium oxide, diatomaceous earth, urea resin, styrene beads, calcined clay, and starch. These fine particulate fillers preferably have a spherical shape, and their dimensions (diameter in the case of a spherical shape) are not particularly limited.

The hot melt adhesive according to one embodiment of the present invention can be produced by blending the (A) copolymer of ethylene with an olefin having 3 to 20 carbon atoms, the (B) copolymer of ethylene with a carboxylic acid derivative having an ethylenic double bond, the (C) tackifying resin and, as required, the (D) wax and/or the above-described various additives in accordance with a generally known hot melt adhesive production method.

For example, the hot melt adhesive according to one embodiment of the present invention can be produced by blending and heat-melting prescribed amounts of the above-described components. An order of adding the components, a heating method and the like are not particularly limited as long as the intended hot melt adhesive can be obtained.

A method of applying the hot melt adhesive is not particularly limited as long as the intended paper product can be obtained; however, a hot melt applicator is widely employed. Examples of the hot melt applicator include ProBlue P4 Melter (trade name) and ProBlue P10 Melter (trade name) which are manufactured by Nordson Corporation.

Application methods are generally classified into contact application and non-contact application. The "contact application" refers to an application method in which an ejector is brought into contact with a member or a film at the time of applying the hot melt adhesive, and the "non-contact application" refers to an application method in which an ejector is not brought into contact with a member or a film at the time of applying the hot melt adhesive. Examples of a contact application method include slot coater coating and roll coater coating, and examples of a non-contact application method include: spiral coating by which the hot melt adhesive can be applied in a spiral form; omega coating and control seam coating by which the hot melt adhesive can be applied in a wave form; slot spray coating and curtain spray coating by which the hot melt adhesive can be applied in a planar form; dot coating by which the hot melt adhesive can be applied in a form of dots; and bead coating by which the hot melt adhesive can be applied in a linear form.

When the hot melt adhesive according to one embodiment of the present invention is applied using a hot melt applicator (even when the hot melt adhesive is discharged and applied in a direction horizontal to the ground using the hot melt applicator), a string-like matter of the hot melt adhesive is hardly discharged. Therefore, an adherend and the applicator are not contaminated with a string-like matter.

The hot melt adhesive according to one embodiment of the present invention is widely utilized in, for example, electronic components, woodworking, building materials, sanitary materials, and paper products. The hot melt adhesive according to one embodiment of the present invention can be suitably used for producing paper products and is thus useful as a hot melt adhesive for paper products.

The paper product according to one embodiment of the present invention is a paper product that is produced using the above-described hot melt adhesive. A type of the paper product is not particularly limited as long as the paper product is produced using the above-described hot melt adhesive, and specific examples of the paper product include bound books, calendars, corrugated cardboards, and cartons. Taking the properties of the hot melt adhesive according to one embodiment of the present invention into consideration, the paper product according to one embodiment of the present invention is particularly effective as a paperboard such as a corrugated cardboard or a carton.

Examples

For the purpose of describing the present invention in more detail and more concretely, the present invention will now be described by way of Examples thereof. The below-described Examples, however, are provided for merely describing the present invention and do not limit the present invention by any means.

Components used for formulating hot melt adhesives are shown below.

(A) Copolymer of Ethylene With Olefin Having 3 to 20 Carbon Atoms (A1) ethylene-octene copolymer (1-octene content: 35 to 37% by mass, melt flow rate: 1,000 g/10 min, AFFINITY GA1900 (trade name) manufactured by Dow Chemical Company)

(A2) ethylene-octene copolymer (1-octene content: 35 to 37% by mass, melt flow rate: 500 g/10 min, AFFINITY GA1950 (trade name) manufactured by Dow Chemical Company)

(A3) ethylene-octene copolymer (1-octene content: 35 to 37% by mass, melt flow rate: 1,200 g/10 min, AFFINITY GA1875 (trade name) manufactured by Dow Chemical Company)

(A4) ethylene-octene copolymer (1-octene content: 30 to 40% by weight, melting point: 68° C., melt flow rate: 660 g/10 min, AFFINITY GA1000R (trade name) manufactured by Dow Chemical Company)

(A5) ethylene-propylene copolymer (ethylene content: 6.0% by mass, melting point: 97° C., melt viscosity at 190° C.: 1,200 mPa·s, VISTAMAXX 88880 (trade name) manufactured by Exxon Mobil Corporation)

(A6) ethylene-hexene copolymer (NIPOLON Z HM510R (trade name) manufactured by Tosoh Corporation)

(B) Copolymer of Ethylene With Carboxylic Acid Derivative Having Ethylenic Double Bond (B1) Copolymer of Ethylene with (Meth)acrylic Acid Derivative, Having Melt Flow Rate of 1 to 38 g/10 min (B1-1) ethylene-methyl methacrylate copolymer (methyl methacrylate content: 20% by mass, melt flow rate: 20 g/10 min, ACRYFT WH401-F (trade name) manufactured by Sumitomo Chemical Co., Ltd.)

(B1-2) ethylene-methyl methacrylate copolymer (methyl methacrylate content: 20% by mass, melt flow rate: 2 g/10 min, ACRYFT WH206-F (trade name) manufactured by Sumitomo Chemical Co., Ltd.)

(B1-3) ethylene-methyl methacrylate copolymer (methyl methacrylate content: 10% by mass, melt flow rate: 7 g/10 min, ACRYFT WH301-F (trade name) manufactured by Sumitomo Chemical Co., Ltd.)

(B1-4) ethylene-methyl methacrylate copolymer (methyl methacrylate content: 5% by mass, melt flow rate: 2 g/10 min, ACRYFT WD203-1 (trade name) manufactured by Sumitomo Chemical Co., Ltd.)

(B1-5) ethylene-methyl methacrylate copolymer (methyl methacrylate content: 24% by mass, melt flow rate: 2 g/10 min, LOTRYL 24MA02N (trade name) manufactured by Arkema K.K.)

(B1-6) ethylene-methyl methacrylate copolymer (methyl methacrylate content: 20% by mass, melt flow rate: 8 g/10 min, LOTADER 4503 (trade name) manufactured by Arkema K.K.)

(B1-7) ethylene-butyl acrylate copolymer (butyl acrylate content: 17% by mass, melt flow rate: 7 g/10 min, LOTRYL 17BA07N (trade name) manufactured by Arkema K.K.)

(B1-8) ethylene-ethyl acrylate copolymer (ethyl acrylate content: 20% by mass, melt flow rate: 20 g/10 min, DPDJ-9169 (trade name) manufactured by Dow Chemical Company)

(B1-9) ethylene-ethyl acrylate copolymer (ethyl acrylate content: 7% by mass, melt flow rate: 4 g/10 min, NUC-6220 (trade name) manufactured by Dow Chemical Company)

(B1-10) ethylene-methacrylic acid copolymer (methacrylic acid content: 10% by mass, melt flow rate: 35 g/10 min, NUCREL N1035 (trade name) manufactured by Dow-Mitsui Polychemicals Co., Ltd.)

(B1-11) ethylene-acrylic acid copolymer (acrylic acid content: 10% by mass, melt flow rate: 30 g/10 min, ESCOR 5080 (trade name) manufactured by Exxon Mobil Corporation)

Component (B2): "Copolymer of Ethylene with (Meth) acrylic Acid Derivative" Not Corresponding to Component (B1)

(B2-1) ethylene-methyl methacrylate copolymer (methyl methacrylate content: 32% by mass, melt flow rate: 450 g/10 min, ACRYFT CM5022 (trade name) manufactured by Sumitomo Chemical Co., Ltd.)

(B2-2) ethylene-methyl methacrylate copolymer (methyl methacrylate content: 28% by mass, melt flow rate: 150 g/10 min, ACRYFT CM5023 (trade name) manufactured by Sumitomo Chemical Co., Ltd.)

(B2-3) ethylene-butyl acrylate copolymer (butyl acrylate content: 35% by mass, melt flow rate: 320 g/10 min, LOTRYL 35BA320 (trade name) manufactured by Arkema K.K.)

(B2-4) ethylene-butyl acrylate copolymer (butyl acrylate content: 35% by mass, melt flow rate: 40 g/10 min, LOTRYL 35BA40 (trade name) manufactured by Arkema K.K.)

(B2-5) ethylene-butyl acrylate copolymer (butyl acrylate content: 28% by mass, melt flow rate: 175 g/10 min, LOTRYL 28BA175 (trade name) manufactured by Arkema K.K.)

(C) Tackifying Resin (C1) Partially Hydrogenated Tackifying Resin (C1-1) hydrogenated alicyclic/aromatic copolymer hydrocarbon resin (softening point: 103° C., T-REZ HC103 (trade name) manufactured by ENEOS Corporation)

(C2) Completely Hydrogenated Tackifying Resin (C2-1) hydrogenated alicyclic hydrocarbon resin (softening point: 103° C., T-REZ HA103 (trade name) manufactured by ENEOS Corporation)

(C2-2) hydrogenated alicyclic hydrocarbon resin (softening point: 125° C., T-REZ HA125 (trade name) manufactured by ENEOS Corporation)

(C2-3) hydrogenated alicyclic hydrocarbon resin (softening point: 125° C., I-MARV P125 (trade name) manufactured by Idemitsu Kosan Co., Ltd.)

(D) Wax (D1) Fischer-Tropsch wax (melting point: 108° C., penetration: 2, SASOL H1 (trade name) manufactured by Sasol Wax GmbH Co.)

(D2) Fischer-Tropsch wax (melting point: 112° C., penetration: 2, SASOL C105 (trade name) manufactured by Sasol Wax GmbH Co.)

(D3) paraffin wax (melting point: 69° C., penetration: 12, PARAFFIN 155F (trade name) manufactured by Nippon Seiro Co., Ltd.)

(D4) microcrystalline wax (melting point: 84° C., penetration: 12, HI-MIC 1080 (trade name) manufactured by Nippon Seiro Co., Ltd.)

(D5) polyethylene wax (melting point: 109° C., penetration: 7, HI-WAX 320P (trade name) manufactured by Mitsui Chemicals, Inc.)

(D6) polypropylene wax (melting point: 140 to 148° C., penetration: 1 or less, HI-WAX NP105 (trade name) manufactured by Mitsui Chemicals, Inc.)

(E) Stabilizer (E1) phenolic antioxidant (ADK STAB AO-60 (trade name) manufactured by ADEKA Corporation)

(E2) phosphorus-based antioxidant (JP650 manufactured by Johoku Chemical Co., Ltd.)

(E3) sulfur-based antioxidant (SUMILIZER TPS manufactured by Sumitomo Chemical Co., Ltd.)

The above-described components were melt-mixed at the respective ratios (parts by mass) shown in Tables 1 and 2. The components were melt-mixed at about 145° C. for about one hour using a universal stirrer to prepare hot melt adhesives of Examples 1 to 14 and Comparative Examples 1 to 6. For each of the thus obtained hot melt adhesives of Examples and Comparative Examples, the adhesion, the thermal stability, the setting property, and the stringiness were evaluated by the below-described respective methods.

With regard to the adhesion, each hot melt adhesive was applied to a K-liner corrugated cardboard, which was subsequently pasted together with another K-liner corrugated cardboard to obtain a sample. As for the thermal stability, the hot melt adhesives were stored in a 150° C. atmosphere for one week (168 hours), after which the rate of change in viscosity and the carbide generation were checked. The setting property was evaluated by preparing samples with various press times and performing a peeling test on the respective samples. The stringiness was checked in terms of the discharged state of each hot melt adhesive under a condition of 180° C. The evaluations are summarized below.

<Adhesion>

(Sample Preparation)

Each hot melt adhesive melted at 180° C. was applied to a K-liner corrugated cardboard in an amount of 2 g/m and, after an open time of 3 seconds, this K-liner corrugated cardboard was pasted together with another K-liner corrugated cardboard under a pressing pressure of 1 kg/25 cm² for a set time (press time) of 10 seconds, whereby a sample was prepared. At least three samples were prepared for each hot melt adhesive.

(Evaluation Method)

The thus prepared samples were aged for 24 hours in an incubator set at 60° C., 23° C., or −10° C. Subsequently, each sample was forcibly peeled off by hand under the same atmosphere. The breakage ratio of the K-linear corrugated cardboards with respect to a total adhered area was defined as "material breakage rate" (ratio of broken material), and the state of the adhered surfaces of the K-linear corrugated cardboards was evaluated. The evaluation criteria were as follows.

◎: The material breakage rate was higher than 80%.

○: The material breakage rate was 60% to 80%.

Δ: The material breakage rate was 40% or higher but lower than 60%.

x: The material breakage rate was lower than 40%.

<Thermal Stability>

(Sample Preparation)

To a 100-cc glass bottle, 50 g of each hot melt adhesive was added, and this glass bottle was stored in a 150° C. incubator for 168 hours to prepare a sample.

(Evaluation Method)

The sample of each hot melt adhesive obtained by the 168-hour storage in the 150° C. incubator was visually observed to check the presence or absence of carbide generation, the separation state of the hot melt adhesive, and the like. The evaluation criteria were as follows.

Carbide Generation

◎: No carbide was generated.

○: A carbide was slightly generated.

Δ: A carbide was generated.

x: A carbide was markedly generated.

Separation State

◎: No precipitate was formed.

○: A precipitate was slightly formed.

Δ: A precipitate was formed.

x: A precipitate was markedly formed.

<Setting Property>

(Sample Preparation)

Each hot melt adhesive melted at 180° C. was applied to a K-liner corrugated cardboard in an amount of 2 g/m and, after an open time of 3 seconds, this K-liner corrugated cardboard was pasted together with another K-liner corrugated cardboard under a pressing pressure of 1 kg/25 cm² for various set times (press times), whereby samples were prepared.

18

(Evaluation Method)

Using a KANEBO Tester (trade name) available from MEC Co., Ltd., the thus prepared samples were each immediately peeled off forcibly at a constant rate in the vertical direction (90°), and the peeling strength was measured. Further, the state of the thus peeled K-linear corrugated cardboard was visually observed. The shortest time required for the K-linear corrugated cardboard to be broken (material breakage rate: 40% or higher) with a peeling strength of 6 kgf/or higher was defined as "set time" and recorded. The evaluation criteria were as follows.

◎: The set time was shorter than 1.0 second.

○: The set time was 1.0 to 1.5 seconds.

x: The set time was longer than 1.5 seconds.

<Reduction of Stringing>

Each hot melt adhesive was intermittently applied perpendicularly to an adherend that was positioned 20 cm away from a tip of a hot melt gun. The state of droppings between the hot melt gun and the adherend was visually observed to evaluate the stringiness.

(Measurement Conditions)

Temperature setting: a tank, a hose, and a nozzle were all set at 180° C.

Nozzle diameter: 14/1,000 inches

Nozzle: 4 orifices (number of discharge ports: 4)

Discharge pressure: 0.3 MPa

Number of discharged shots: 180 shots/min from each of the 4 orifices

The evaluation criteria were as follows.

◎: The droppings had a granular shape.

○: The droppings mostly had a granular shape, but a small number of droppings had a string-like shape.

Δ: The droppings were a mixture of granular droppings and string-like droppings.

x: The droppings had a string-like shape.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| (A) | | (A1) | | | | | | | | 27.5 | | |
| | | (A2) | 41.2 | 45 | 35 | 42.5 | 41.3 | 37.5 | 43.8 | | 31.3 | 37 |
| | | (A3) | | | | | | | | | 2.5 | |
| | | (A4) | | | | | 3.7 | | | 1.2 | | |
| | | (A5) | | | | | | | | 12.5 | | |
| | | (A6) | | | | | | | | | | 3.8 |
| (B) | (B1) | (B1-1) | 6.3 | | | | | | | | | 4.9 |
| | | (B1-2) | | 2.5 | | | | | | | | |
| | | (B1-3) | | | 3.7 | | | | | | | |
| | | (B1-4) | | | | | 3.8 | | | | | |
| | | (B1-5) | | | | | 1.2 | 2.5 | | 1.2 | | |
| | | (B1-6) | | | | | | | 2.5 | | | |
| | | (B1-7) | | | | | | | | 2.5 | | |
| | | (B1-8) | | | | | | | | 3.8 | | |
| | | (B1-9) | | | | | | | | | 6.2 | |
| | | (B1-10) | | | | | | | | | | |
| | | (B1-11) | | | | | | | | | | |
| | (B2) | (B2-1) | | | | | | | | | | |
| | | (B2-2) | | | | | | | | | | |
| | | (B2-3) | | | | | | | | | | |
| | | (B2-4) | | | | | | | | | | |
| | | (B2-5) | | | | | | | | | | |
| (C) | (C1) | (C1-1) | 15 | 18.8 | | 15 | 12.5 | 16.2 | 15 | 15 | 12.5 | 18.5 |
| | | (C2-1) | | | | | 6.2 | | | 40 | | |
| | (C2) | (C2-2) | | | 61.3 | | | | 43.8 | 12.5 | | 35.8 |
| | | (C2-3) | 37.5 | 33.7 | | 31.3 | 40 | | 25 | | 47.5 | |
| (A) to (C) | Total | | 100 | 100 | 100 | 100 | 100 | 100 | 100 | 100 | 100 | 100 |
| (D) | (D1) | | 25 | 25 | 25 | 25 | 25 | 25 | 25 | | 25 | 19.7 |
| | (D2) | | | | | | | | | 25 | | |
| | (D3) | | | | | | | | | | | |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| | (D4) | | | | | | | | | | 3.7 |
| | (D5) | | | | | | | | | | |
| | (D6) | | | | | | | | | | |
| (E) | (E1) | 0.38 | 0.38 | 0.38 | 0.38 | 0.38 | 0.38 | 0.38 | 0.38 | 0.38 | 0.37 |
| | (E2) | 0.38 | 0.38 | 0.38 | 0.38 | 0.38 | 0.38 | 0.38 | 0.38 | 0.38 | 0.37 |
| | (E3) | 0.38 | 0.38 | 0.38 | 0.38 | 0.38 | 0.38 | 0.38 | 0.38 | 0.38 | 0.37 |
| Adhesion | 60° C. | ⊚ | ⊚ | ⊚ | ⊚ | ⊚ | ⊚ | ⊚ | ⊚ | ⊚ | ⊚ |
| | 23° C. | ⊚ | ⊚ | ⊚ | ⊚ | ⊚ | ⊚ | ⊚ | ⊚ | ⊚ | ⊚ |
| | −10° C. | ⊚ | ⊚ | ⊚ | ○ | ⊚ | ○ | ○ | ⊚ | ⊚ | ⊚ |
| Thermal stability | Carbide | ⊚ | ⊚ | ⊚ | ⊚ | ○ | ⊚ | ○ | ○ | ⊚ | ⊚ |
| | Precipitate | ⊚ | ⊚ | ⊚ | ⊚ | ○ | ○ | ⊚ | ⊚ | ⊚ | ⊚ |
| Setting property | 23° C. | ⊚ | ⊚ | ⊚ | ○ | ⊚ | ⊚ | ⊚ | ○ | ⊚ | ○ |
| Stringiness | | ⊚ | ⊚ | ⊚ | ⊚ | ⊚ | ⊚ | ⊚ | ⊚ | ○ | ⊚ |

TABLE 2

| | | Example | | | | Comparative Example | | | | | |
|---|---|---|---|---|---|---|---|---|---|---|---|
| | | 11 | 12 | 13 | 14 | 1 | 2 | 3 | 4 | 5 | 6 |
| (A) | (A1) | 34.5 | 35 | | | 37.5 | 41.3 | 41.3 | 43.8 | 41.3 | 41.3 |
| | (A2) | | | 42.5 | 42.5 | | | | | | |
| | (A3) | | | | | | | | | | |
| | (A4) | | | | | | | | | | |
| | (A5) | | | | | | | | | | |
| | (A6) | | | | | | | | | | |
| (B) (B1) | (B1-1) | 6.2 | 5 | | | | | | | | |
| | (B1-2) | | | | | | | | | | |
| | (B1-3) | | | | | | | | | | |
| | (B1-4) | | | | | | | | | | |
| | (B1-5) | | | | | | | | | | |
| | (B1-6) | | | | | | | | | | |
| | (B1-7) | | | 3.8 | 3.8 | | | | | | |
| | (B1-8) | | | | | | | | | | |
| | (B1-9) | | | | | | | | | | |
| | (B1-10) | | | 1.2 | | | | | | | |
| | (B1-11) | | | | 1.2 | | | | | | |
| (B2) | (B2-1) | | | | | 10 | | | | | |
| | (B2-2) | | | | | | 6.2 | | | | |
| | (B2-3) | | | | | | | 6.2 | | | |
| | (B2-4) | | | | | | | | 3.7 | | |
| | (B2-5) | | | | | | | | | 6.2 | 6.2 |
| (C) (C1) | (C1-1) | 18.5 | 18.7 | 15 | 15 | 15 | 15 | 15 | 15 | 15 | 15 |
| | (C2-1) | 28.4 | 28.8 | 6.2 | 6.2 | 37.5 | 37.5 | 37.5 | 37.5 | | 37.5 |
| (C2) | (C2-2) | 12.4 | 12.5 | | | | | | | 37.5 | |
| | (C2-3) | | | 31.3 | 31.3 | | | | | | |
| (A) to (C) | Total | 100 | 100 | 100 | 100 | 100 | 100 | 100 | 100 | 100 | 100 |
| (D) | (D1) | 19.7 | 23.8 | 25 | 25 | 25 | 25 | 25 | 25 | 25 | 25 |
| | (D2) | | | | | | | | | | |
| | (D3) | 2.5 | | | | | | | | | |
| | (D4) | | | | | | | | | | |
| | (D5) | 1.2 | | | | | | | | | |
| | (D6) | | 1.2 | | | | | | | | |
| (E) | (E1) | 0.37 | 0.38 | 0.38 | 0.38 | 0.38 | 0.38 | 0.38 | 0.38 | 0.38 | 0.38 |
| | (E2) | 0.37 | 0.38 | 0.38 | 0.38 | 0.38 | 0.38 | 0.38 | 0.38 | 0.38 | 0.38 |
| | (E3) | 0.37 | 0.38 | 0.38 | 0.38 | 0.38 | 0.38 | 0.38 | 0.38 | 0.38 | 0.38 |
| Adhesion | 60° C. | ○ | ⊚ | ⊚ | ⊚ | ○ | ⊚ | ⊚ | ⊚ | ○ | ○ |
| | 23° C. | ⊚ | ⊚ | ⊚ | ⊚ | ⊚ | ⊚ | ⊚ | ⊚ | ⊚ | ⊚ |
| | −10° C. | ⊚ | ○ | ○ | ⊚ | ⊚ | ⊚ | ⊚ | ⊚ | ○ | ⊚ |
| Thermal stability | Carbide | ⊚ | ⊚ | ○ | ○ | X | ○ | X | ○ | ○ | ○ |
| | Precipitate | ⊚ | ⊚ | ⊚ | ⊚ | X | X | X | X | ○ | ○ |
| Setting property | 23° C. | ○ | ⊚ | ○ | ⊚ | X | ○ | X | ○ | X | X |
| Stringiness | | ○ | ○ | ○ | ○ | ○ | ○ | X | ○ | X | X |

As shown in Tables 1 and 2, the hot melt adhesives of Examples 1 to 14 contained (A) a copolymer of ethylene with an olefin having 3 to 20 carbon atoms, (B1) an ethylene-(meth)acrylic acid ester copolymer having a melt flow rate of 1 to 38 g/10 min, and (C) a tackifying resin; therefore, these hot melt adhesives had an excellent overall balance of the adhesion, the thermal stability, the setting property, and the stringiness.

Particularly, in the hot melt adhesives of Examples 1 to 3, the thermal stability was improved while stringing was reduced at a higher level. The hot melt adhesives of Examples are useful in the field of paper processing, particularly for application to paperboards such as corrugated cardboards and cartons.

On the other hand, as shown in Table 2, the hot melt adhesives of Comparative Examples 1 to 6 did not contain the component (B1); therefore, these hot melt adhesives had markedly inferior performance in terms of one of the adhesion, the thermal stability, and the reduction of stringing.

INDUSTRIAL APPLICABILITY

The present invention can provide a hot melt adhesive and a paper product to which the hot melt adhesive is applied. As the paper product according to the present invention, one produced from a paperboard, such as a corrugated cardboard or a carton, is particularly effective.

CROSS-REFERENCE TO RELATED APPLICATIONS

This application claims benefit under Paris Convention of Japanese Patent Application No. 2020-206097 filed on Dec. 11, 2020, incorporated herein by reference in its entirety.

The invention claimed is:

1. A hot melt adhesive composition comprising:
a copolymer of ethylene and an olefin, the olefin having 3 to 20 carbon atoms;
a copolymer of ethylene and a carboxylic acid derivative having an ethylenic double bond;
a tackifying resin; and
a wax, wherein:
the copolymer of ethylene and the carboxylic acid derivative comprises a copolymer of ethylene and a (meth)acrylic acid derivative, the copolymer of ethylene and the (meth)acrylic acid derivative having a melt flow rate of from 1 to 8 g/10 min, measured at 190° C. with a 2.16 kg load in accordance with JIS K7210,
the copolymer of ethylene and the olefin is present in an amount of from 20 to 50 parts by mass, based on 100 parts by total mass of the copolymer of ethylene and the olefin, the copolymer of ethylene and the carboxylic acid derivative, and the tackifying resin, and
the tackifying resin is present in an amount of from 40 to 55 parts by mass, based on 100 parts by total mass of the copolymer of ethylene and the olefin, the copolymer of ethylene and the carboxylic acid derivative, and the tackifying resin.

2. The composition of claim 1, wherein the copolymer of ethylene and the (meth)acrylic acid derivative is present in an amount of from 1 to 10 parts by mass, based on 100 parts by total mass of the copolymer of ethylene and the olefin, the copolymer of ethylene and the carboxylic acid derivative, and the tackifying resin.

3. The composition of claim 1, wherein the copolymer of ethylene and the (meth)acrylic acid derivative further comprises a copolymer of ethylene and a (meth)acrylic acid ester.

4. The composition of claim 1, wherein the wax comprises a Fischer-Tropsch wax.

5. A paper product comprising the hot melt adhesive composition of claim 1.

6. The composition of claim 1, wherein the copolymer of ethylene and the olefin is a metallocene-based copolymer of ethylene.

7. The composition of claim 1, wherein the tackifying resin comprises a hydrocarbon resin having a softening point of lower than 120° C. and a hydrocarbon resin having a softening point of greater than 120° C.

8. The composition of claim 1, wherein the melting point of the wax is from 70° C. to 120° C.

9. The composition of claim 1, wherein the wax is selected from the group consisting of Fischer-Tropsch waxes, paraffin waxes, microcrystalline waxes, polyethylene waxes, polypropylene waxes, and any combination thereof.

10. The composition of claim 1, wherein the copolymer of ethylene and the carboxylic acid derivative further comprises another copolymer of ethylene and a (meth)acrylic acid derivative, the another copolymer of ethylene and the (meth)acrylic acid derivative having a melt flow rate of less than 1 g/10 min, measured at 190° C. with a 2.16 kg load in accordance with JIS K7210.

11. The composition of claim 1, wherein the copolymer of ethylene and the carboxylic acid derivative further comprises another copolymer of ethylene and a (meth)acrylic acid derivative, the another copolymer of ethylene and the (meth)acrylic acid derivative having a melt flow rate of greater than 38 g/10 min, measured at 190° C. with a 2.16 kg load in accordance with JIS K7210.

12. The composition of claim 1, further comprising at least one additive selected from the group consisting of a plasticizer, a stabilizer, and a filler.

13. The composition of claim 12, wherein the stabilizer is selected from the group consisting of a phenolic antioxidant, a phosphorus-based antioxidant, and a sulfur-based antioxidant.

14. The composition of claim 1, wherein the copolymer and the olefin is selected from the group consisting of an ethylene-octene copolymer, ethylene-octene copolymer, an ethylene-propylene copolymer, and an ethylene-hexene copolymer.

* * * * *